(12) United States Patent
Dong et al.

(10) Patent No.: US 12,041,699 B2
(45) Date of Patent: Jul. 16, 2024

(54) LIGHTING DEVICE

(71) Applicant: SHENZHEN INTELTRON INTELLIGENT SCIENCE & TECHNOLOGY CO., LTD., Guangdong (CN)

(72) Inventors: Xiaoyong Dong, Guangdong (CN); Dongqing Huang, Guangdong (CN); Bo Tang, Guangdong (CN)

(73) Assignee: SHENZHEN INTELTRON INTELLIGENT SCIENCE & TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/097,571

(22) Filed: Jan. 17, 2023

(65) Prior Publication Data

US 2024/0040678 A1  Feb. 1, 2024

(30) Foreign Application Priority Data

Jul. 26, 2022  (CN) .......................... 202221940703.9

(51) Int. Cl.
*H05B 45/10*  (2020.01)
(52) U.S. Cl.
CPC .................... *H05B 45/10* (2020.01)

(58) Field of Classification Search
CPC ........ H05B 45/10; H05B 45/37; H05B 45/20; Y02B 20/40
See application file for complete search history.

(56) References Cited

U.S. PATENT DOCUMENTS

| | | | |
|---|---|---|---|
| 11,259,377 B2 * | 2/2022 | Serra | F21V 23/003 |
| 2016/0381759 A1 * | 12/2016 | Watanabe | H05B 45/375 |
| | | | 315/297 |
| 2019/0098722 A1 * | 3/2019 | DeMayo | H05B 45/22 |
| 2019/0098723 A1 * | 3/2019 | Sadwick | F21K 9/272 |

* cited by examiner

*Primary Examiner* — Minh D A
(74) *Attorney, Agent, or Firm* — Cooper Legal Group, LLC

(57) ABSTRACT

Disclosed is a lighting device with low-power consumption, including: a rectification circuit, a supply circuit of intelligent module, an intelligent module, a silicon controlled dimming circuit, a white light driving circuit, a white light lamp panel, a RGB driving circuit, and a RGB lamp panel. The above lighting device with low-power consumption can provide maintenance current through the silicon controlled dimming circuit. During operation of the white light driving circuit, the silicon controlled dimming circuit keeps working consistently. When the lighting function is turned off, the silicon controlled dimming circuit turns off the output and enters a standby state.

9 Claims, 8 Drawing Sheets

LIGHTING DEVICE

CROSS-REFERENCE TO RELATED APPLICATION

This application claims the priority and benefit of Chinese patent application serial no. 202221940703.9, filed on Jul. 26, 2022. The entirety of Chinese patent application serial no. 202221940703.9 is hereby incorporated by reference herein and made a part of this specification.

TECHNICAL FIELD

This application relates to a technical field of circuit control, and, in particular, to a lighting device.

BACKGROUND

In a traditional lighting circuit, a silicon controlled dimmer is usually installed. For example, in the home lighting circuit, a silicon controlled dimmer is usually configured to adjust the lighting of the lighting lamp. In use, intelligent lighting products must both be compatible with silicon controlled dimmers and achieve the intelligent dimming function. However, the dimmer in the prior art cannot achieve full compatibility with the silicon controlled and intelligent dimming function, which leads to limitation of the dimming control function of lighting devices, so there are great limitations in use. Therefore, the lighting device in the prior art has insufficient compatibility.

SUMMARY

A lighting device with low-power consumption is disclosed, in order to solve the problem of insufficient compatibility of the lighting devices in the prior art.

In one aspect, a lighting device with low-power consumption is disclosed, including: a rectification circuit, a supply circuit of intelligent module, an intelligent module, a silicon controlled dimming circuit, a white light driving circuit, a white light lamp panel, a RGB driving circuit, and a RGB lamp panel. An input end of the rectification circuit is connected with an alternating current, a first output end of the rectification circuit is connected with an input end of the supply circuit of intelligent module, a second output end of the rectification circuit is connected with a first input end of the silicon controlled dimming circuit and a first input end of the white light driving circuit simultaneously, and a third output end of the rectification circuit is connected with a first input end of the RGB driving circuit. An output end of the supply circuit of intelligent module is connected with an input end of the intelligent module, a first output end of the intelligent module is connected with a second input end of the silicon controlled dimming circuit, a second output end of the intelligent module is connected with a second input end of the RGB driving circuit, a third output end of the intelligent module is connected with a second input end of the white light driving circuit. An output end of the RGB driving circuit is connected with the RGB lamp panel, and an output end of the white light driving circuit is connected with the white light lamp panel.

By the above technical solution, the rectification circuit first converts AC of mains supply into DC, wherein the supply circuit of intelligent module provides a stable voltage input for the intelligent module, and the white light driving circuit and the RGB driving circuit adjust the color temperature and brightness of a LED lamp panel and a RGB lamp panel through PWM. PWM dimming is a kind of linear control, which changes the duty cycle with the change of input voltage, and then regulates the working voltage of the LED lamp panel and the RGB lamp panel to change the brightness. The input voltage of PWM dimming is controlled by the silicon controlled dimmer, which can also be controlled by adjusting the intelligent module, to achieve the brightness control of the RGB lamp panel and the white lamp panel. A lighting mode compatible with silicon controlled dimming and intelligent dimming is achieved, dimming control function of the lighting device is enriched, the scope of use is expanded, practical value is improved. The present application is compatible with the dimming effect of 1-100%, improving the customer's experience.

In some embodiments, the silicon controlled dimming circuit includes a first resistor, a second resistor, a third resistor, a fourth resistor, a field-effect transistor, a piezoresistor and a silicon controlled dimming control chip. One end of the first resistor, as the first input end of the silicon controlled dimming circuit, is connected with the second output end of the rectification circuit, the other end of the first resistor is connected with a seventh pin of the silicon controlled dimming control chip and one end of the piezoresistor. The other end of the piezoresistor is connected with a first pin, a third pin of the silicon controlled dimming control chip, one end of the fourth resistor, and a source electrode of the field-effect transistor, and is grounded. The other end of the fourth resistor, as the second input end of the silicon controlled dimming circuit, is connected with the first output end of the intelligent module after being connected with a gate electrode of the field-effect transistor. A drain electrode of the field-effect transistor is connected with one end of the third resistor, the other end of the third resistor is connected with one end of the second resistor and a fourth pin of the silicon controlled dimming control chip, and the other end of the second resistor is connected with a second pin of the silicon controlled dimming control chip.

By the above technical solution, the silicon controlled dimming chip provides a stable maintenance current for the silicon controlled dimmer. When it is detected that the pin level of the first output end of the intelligent module is low, the field-effect transistor is cut off, the silicon controlled dimming control chip discharges, power supply is shut down, and the silicon controlled dimmer is in a standby state, so as to reduce the power consumption in the standby state.

In some embodiments, the silicon controlled dimming circuit further includes a fifth resistor, one end of which is connected with the other end of the fourth resistor and the gate electrode of the field-effect transistor, and the other end of the fifth resistor, as the second input end of the silicon controlled dimming circuit, is connected with the intelligent module.

By the above technical solution, one end of the fifth resistor receives a pin level state of the first output end of the intelligent module, wherein the fifth resistor is a driving resistor adaptive to drive the field-effect transistor. The driving resistor can inhibit vibration, limit current, reduce di/dt and improve the use security of the field-effect transistor. In addition, the resistance value of the driving resistor will also affect the switching speed of the field-effect transistor.

In some embodiments, the field-effect transistor is an enhanced N-MOS field-effect transistor.

By the above technical solution, the grid voltage must be greater than the cut-in voltage to conduct the enhanced N-MOS field-effect transistor. The current of the drain electrode of the output end is controlled by the voltage applied to the gate electrode of the input end, and the working state can be judged by detecting the current.

In some embodiments, the rectification circuit includes a high-voltage chip resistor, a rectification chip, a first capacitor, a second capacitor, a third capacitor, a first diode and a first inductor. One end of the high-voltage chip resistor is connected with a first input end of the rectification chip and a phase line of the alternating current, the other end of the high-voltage chip resistor is connected with the second input end of the rectification chip and a neutral line of the alternating current. A positive output end of the rectification chip is connected with one end of the first capacitor and a positive end of the first diode, whose connection point, as the second output end of the rectification circuit, is connected with the first input end of the silicon controlled dimming circuit. A negative output end of the rectification chip is connected with the other end of the first capacitor, a positive pole of the second capacitor, and a positive pole of the third capacitor, and is grounded. A negative pole of the first diode is connected with one end of the first inductor and a negative pole of the second capacitor, the other end of the first inductor is connected with a negative pole of the third capacitor, whose connection point, as a first output end, is connected with the input end of the supply circuit of intelligent module. The connection point of the other end of the first inductor and the negative pole of the third capacitor, also as a third output end, is connected with the first input end of the RGB driving circuit.

By the above technical solution, the high-voltage chip resistor has a good high-frequency performance and can be used as a filter capacitor of circuit. After that, Mains supply flows through the rectification chip, such that AC is converted into DC, while the first capacitor, the second capacitor and the third capacitor are adaptive for filtering. The output voltage has a steady waveform through low charge and high discharge of the capacitor. The second capacitor and the third capacitor are electrolytic capacitors, which may have larger capacity, to possess better filtering effect.

In some embodiments, the rectification circuit further includes a protective tube. One end of the protective tube is connected with the phase line of the alternating current, the other end of the protective tube is connected with one end of the high-voltage chip resistor and the first input end of the rectification chip.

By the above technical solution, the protective tube is configured to protect the components of the circuit from damage. When the circuit current is too large, the protective tube is blown and the circuit is disconnected, thus playing a protective role.

In some embodiments, the supply circuit of intelligent module includes a power supply chip, a sixth resistor, a seventh resistor, a fourth capacitor, a fifth capacitor, a sixth capacitor, a second diode, a third diode and s second inductor. An input end of the power supply chip is connected with a first output end of the rectification chip, an output end of the power supply chip is connected with a selection end, whose connection point is simultaneously connected with one end of the sixth capacitor and a negative pole of the second diode, and a grounded terminal of the power supply chip is connected with one end of the seventh resistor, a negative pole of the third diode, the other end of the sixth capacitor and one end of the second inductor; the test terminal of the power supply chip is connected with the other end of the seventh resistor. A positive pole of the second diode is connected with the other end of the second inductor, one end of the sixth resistor, one end of the fourth capacitor and a negative pole of the fifth capacitor, whose connection point is connected with a regulated power supply. A positive pole of the third diode is connected with the other end of the sixth resistor, the other end of the fourth capacitor and a positive pole of the fifth capacitor, whose connection point is grounded.

By the above technical solution, the input end of the power supply chip receives the steady voltage signals output by the rectification circuit, which is converted into the voltage used by the intelligent module through the power supply chip and withstands rectification and filtering again under the diodes, capacitors and other components, to make the output voltage signals steadier.

In some embodiments, a voltage of the regulated power supply is not lower than 3.3 V.

In the above technical solutions, such a configuration can provide sufficient and stable power voltage input for the intelligent module.

In some embodiments, the intelligent module includes an intelligent chip, a seventh capacitor and an eighth capacitor. A nineteenth pin of the intelligent chip, as a first output end, is connected with the second input end of the silicon controlled dimming circuit. A thirteenth pin of the intelligent chip is connected with one end of the seventh capacitor and one end of the eighth capacitor, and is grounded, a fourteenth pin of the intelligent chip is connected with the other end of the seventh capacitor and the other end of the eighth capacitor, whose connection point is connected with the regulated power supply.

By the above technical solution, the nineteenth pin of the intelligent chip detects that the state, by which the product is off, becomes a state with low-level. The seventh capacitor and the eighth capacitor are connected in series between the regulated power supply and the grounding as filter capacitors, such that the clutter and AC components of the power supply can be filtered out, the pulsating direct current can be smoothed and electric energy can be stored.

To sum up, at least one of the following beneficial technical effects can be realized:

1. The silicon controlled dimming circuit provides the maintenance current for the silicon controlled dimmer. During operation of the white light driving circuit, the silicon controlled dimming circuit keeps working. When the lighting function is turned off, the silicon controlled dimming circuit turns off the output and enters the standby state, so as to achieve low-power consumption. The brightness can be adjusted through the silicon controlled, that is to say, the silicon controlled dimming is compatible. At the same time, wireless signals can be transmitted to the intelligent module through external devices for adjustment, which greatly improves the compatibility of lighting devices.
2. By adding silicon controlled dimming chips and other constant current chips into the circuit, electric energy can be effectively used, such that the PF of the product is greater than 0.9, which improves the utilization rate of true power of the power grid by electrical products and also supports silicon controlled dimming and intelligent dimming.

DESCRIPTION OF THE EMBODIMENTS

Figure 1:
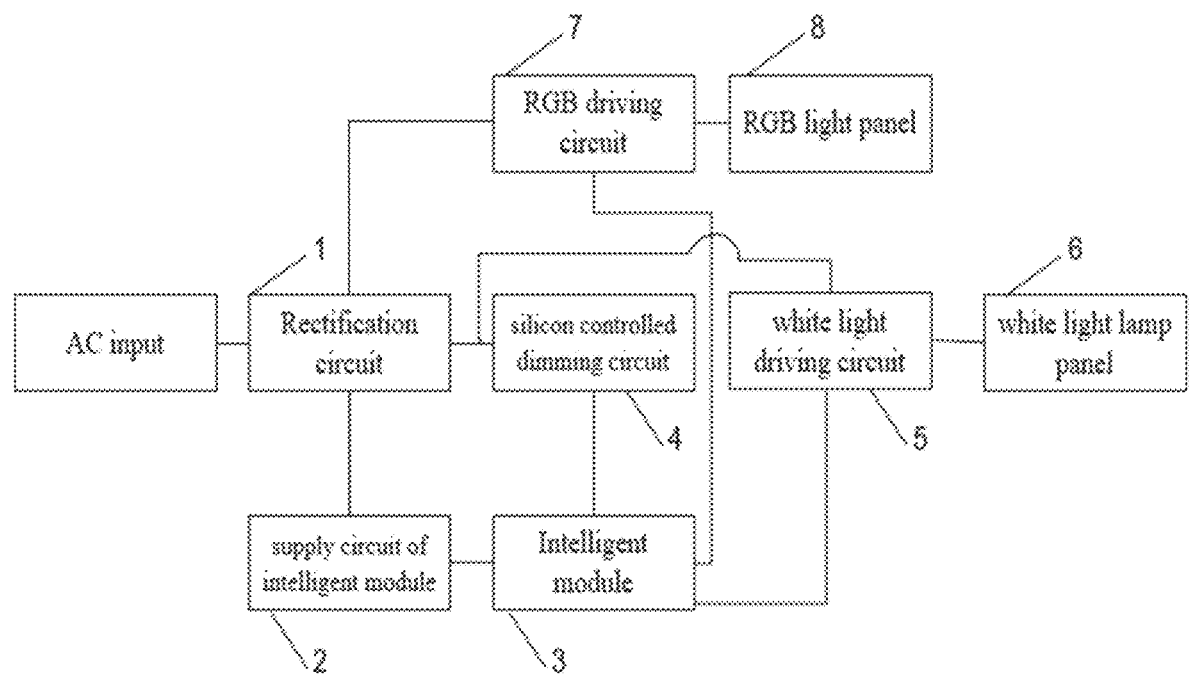
FIG. 1 is an overall block diagram of an intelligent lighting device with low-power consumption in one embodiment of the present disclosure.

The technical solution of the present disclosure will be described clearly and completely below in combination with the drawing 1-10 of the application. Obviously, the described embodiments are a part of the embodiments of the present application, but not all the embodiments. All other embodiments obtained by ordinary technicians in the art based on the embodiments in the present application without creative efforts belong to the protection scope of the present application.

An intelligent lighting device with low-power consumption compatible with silicon controlled dimming includes: a rectification circuit 1, a supply circuit of intelligent module 2, an intelligent module 3, a silicon controlled dimming circuit 4, a white light driving circuit 5, a white light lamp panel 6, a RGB driving circuit 7, and a RGB lamp panel 8. An input end of the rectification circuit 1 is connected with an alternating current (AC input shown in FIG. 1), a first output end thereof is connected with an input end of the supply circuit of intelligent module 2, a second output end thereof is connected with a first input end of the silicon controlled dimming circuit 4 and a first input end of the white light driving circuit 5 simultaneously, and a third output end thereof is connected with a first input end of the RGB driving circuit 7. An output end of the supply circuit of intelligent module 2 is connected with an input end of the intelligent module 3, a first output end of the intelligent module 3 is connected with a second input end of the silicon controlled dimming circuit 4, a second output end of the intelligent module is connected with a second input end of the RGB driving circuit 7, a third output end of the intelligent module is connected with a second input end of the white light driving circuit 5. And an output end of the RGB driving circuit 7 is connected with the RGB lamp panel 8, and an output end of the white light driving circuit 5 is connected with the white light lamp panel 6.

Mains supply flows through the rectification circuit 1, such that AC is converted to DC, and flows through the intelligent module 3, the silicon controlled dimming circuit 4, the white light driving circuit 5 and the RGB driving circuit 7. The silicon controlled dimming circuit 4 provides sufficient maintenance current for the silicon controlled dimmer, the white light driving circuit 5 drives the white light lamp panel 6, the RGB driving circuit 7 drives the RGB lamp panel 8. Different control signals are input by controlling the silicon controlled dimmer (not shown in the figure), which act on the white light driving circuit 5 and the RGB driving circuit 7, thereby realizing the brightness adjustment of the white light lamp panel 6 and the RGB lamp panel 8.

The intelligent module 3 can also output control signals to the white light driving circuit 5 and the RGB driving circuit 7, such that brightness of the white light lamp panel 6 and the RGB lamp panel 8 can be adjusted. Thus, a kind of control mode compatible with silicon controlled dimming and intelligent dimming can be realized, which is extremely practical, and can achieve a full range dimming of 1-100%, improving the customer's experience.

Figure 2:
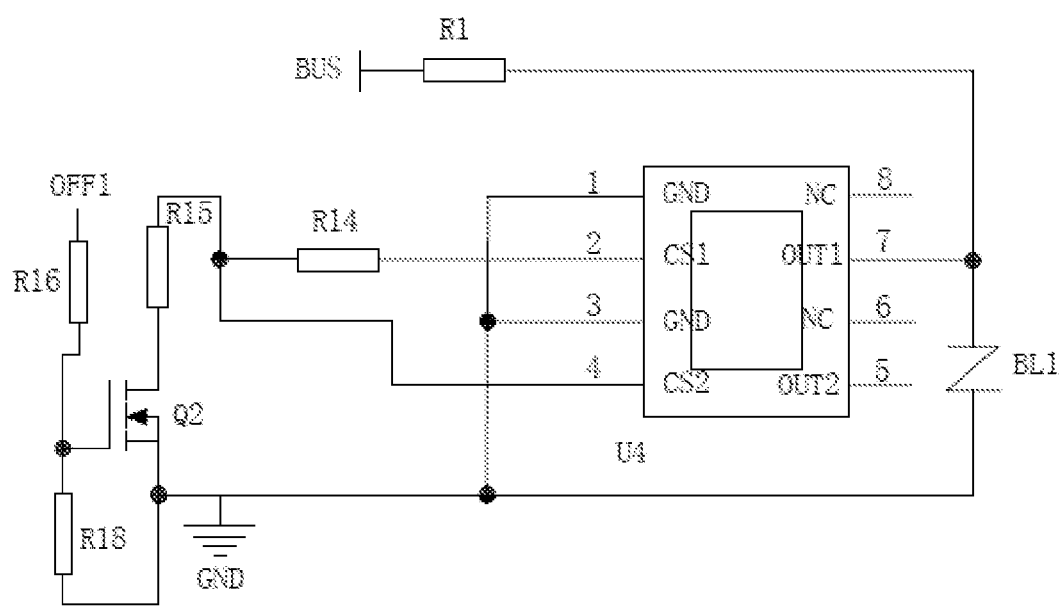
FIG. 2 is a circuit diagram of a silicon controlled dimming circuit in one embodiment of the present disclosure.

In one embodiment as shown in FIG. 2, the silicon controlled dimming circuit 4 includes a first resistor R1, a second resistor R14, a third resistor R15, a fourth resistor R18, a fifth resistor R16, a field-effect transistor Q2, a piezoresistor BL1 and a silicon controlled dimming control chip U4. One end of the first resistor R1, as the first input end of the silicon controlled dimming circuit 4, is connected with the second output end of the rectification circuit 1, the other end of the first resistor R1 is connected with a seventh pin U4_7 of the silicon controlled dimming control chip U4 and one end of the piezoresistor BL1. The other end of the piezoresistor BL1 is connected with a first pin U4_1, a third pin U4_3 of the silicon controlled dimming control chip U4, one end of the fourth resistor R18, with a source electrode of the field-effect transistor Q2, and is grounded. The other end of the fourth resistor R18 is connected with one end of the fifth resistor R16 after connecting with a gate electrode of the field-effect transistor Q2. The other end of the fifth resistor R16, as the second input end of the silicon controlled dimming circuit 4, is connected with the first output end of the intelligent module 3. A drain electrode of the field-effect transistor Q2 is connected with one end of the third resistor R15, the other end of the third resistor R15 is connected with one end of the second resistor R14 and a fourth pin U4_4 of the silicon controlled dimming control chip U4. And the other end of the second resistor R14 is connected with a second pin U4_2 of the silicon controlled dimming control chip U4. Particularly, the field-effect transistor Q2 is an enhanced N-MOS field-effect transistor.

When the silicon controlled dimmer (not shown in the figure) is connected to a product, the silicon controlled dimming control chip U4 in the silicon controlled dimming circuit 4 provides sufficient maintenance current for the silicon controlled in the silicon controlled dimmer, to ensure a normal operation of the silicon controlled dimmer. The dimming control chip U4 can keep the silicon controlled dimmer working in a stable state by discharging. The fifth resistor R16 is a driving resistor that drives the field-effect transistor Q2, which can inhibit vibration, limit current, reduce di/dt and improve the use security of the field-effect transistor Q2, wherein the resistance value of the fifth resistor will also affect the switching speed of the field-effect transistor Q2. The fourth resistor R18 is the protection resistance of the field-effect transistor Q2; the second resistor R14 and the third resistor R15 are sampling resistors, which act on the sampling terminal CS1 (the second pin U4_2) of the silicon controlled dimming control chip U4. The enhanced N-MOS field-effect transistor Q2 is conducted with high-level and cut off with low-level. When it is recognized that the first output end of the intelligent module 3 is at a low-level state, the N-MOS field-effect transistor Q2 is cutoff, the silicon controlled dimming control chip U4 stops working, and the product is in a standby state, thus reducing the standby power of the product.

Figure 3:
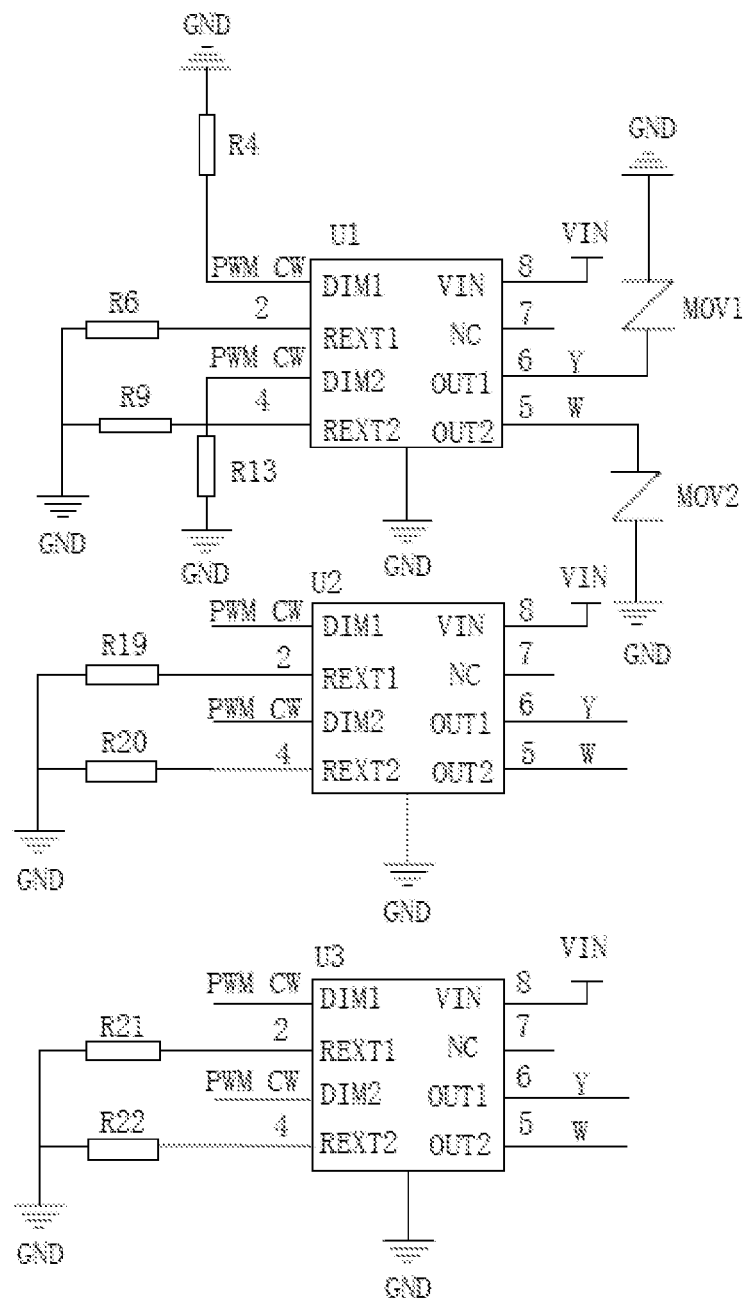
FIG. 3 is a circuit diagram of a white light driving circuit in one embodiment of the present disclosure.
Figure 4:
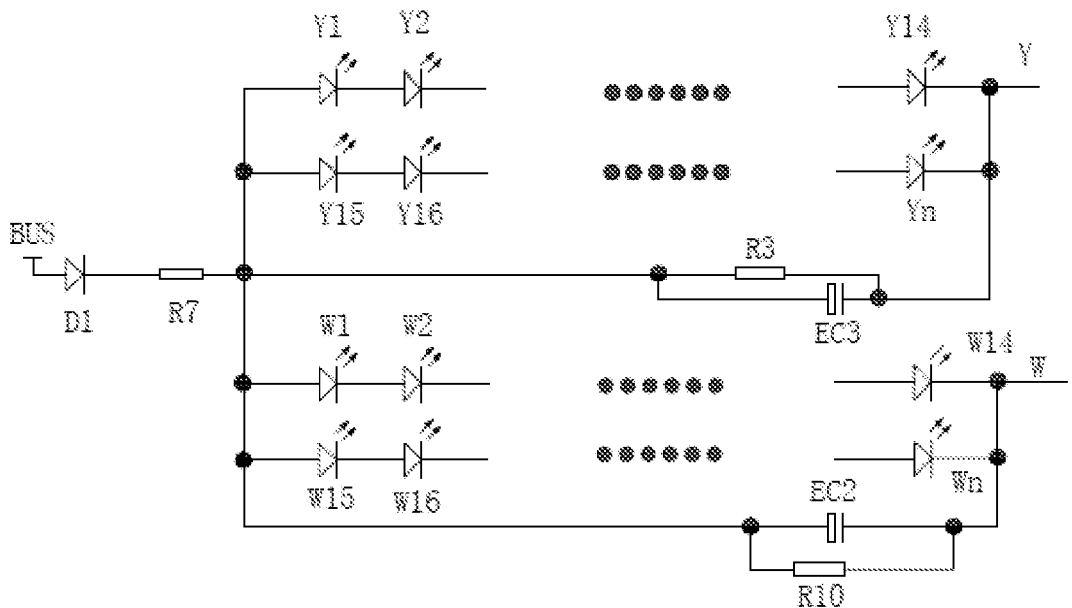
FIG. 4 is a circuit diagram of a white light lamp panel in one embodiment of the present disclosure.
Figure 5:
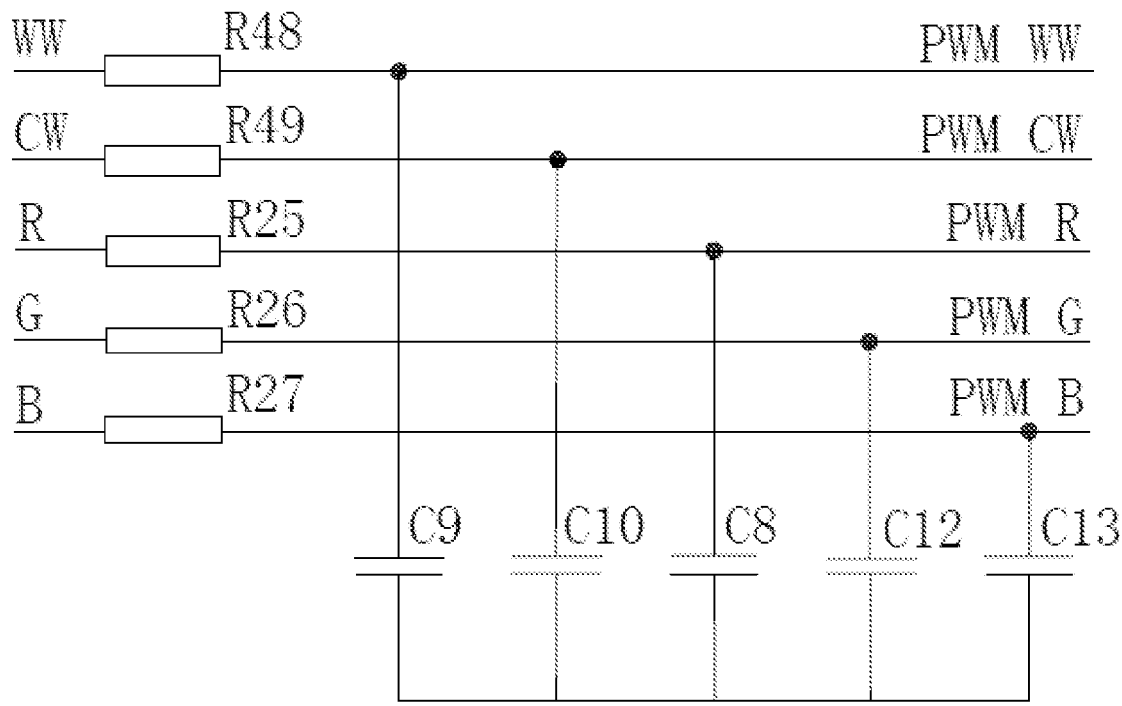
FIG. 5 is a circuit diagram of one embodiment of the present disclosure.

Specially referring to FIG. 3 to FIG. 5, the white light driving circuit 5 includes a first white light power supply chip U1, a second white light power supply chip U2, a third white light power supply chip U3, a first white light driving resistor R48, a second white light driving resistor R49, a third white light driving resistor R6, a fourth white light driving resistor R9, a fifth white light driving resistor R4, a sixth white light driving resistor R13, a seventh white light driving resistor R19, an eighth white light driving resistor R20, a ninth white light driving resistor R21, a tenth white light driving resistor R22, a first white light piezoresistor MOV1, a second white light piezoresistor MOV2, a first white light driving capacitor C9 and a second white light driving capacitor C10.

The pins WW1 and CW2 of the intelligent module 3 are connected with the pin DIM1 and the pin DIM2 of the first white light power supply chip U1, the second white light power supply chip U2 and the third white light power supply chip U3 through the first white light driving resistor R48 and the second white light driving resistor R49. Two output pins OUT1 and OUT2 of the first white light power supply chip U1, the second white light power supply chip U2 and the third white light power supply chip U3 are respectively connected with the two input ends of the white light lamp panel 6. The pins REXT1 and REXT2 of the first white light power supply chip U1 are respectively connected with one end of the third white light driving resistor R6 and the fourth white light driving resistor R9, and the other ends of the third white light driving resistor R6 and the fourth white light driving resistor R9 are grounded. The DIM1 pin of the first white light power supply chip U1 is further connected with one end of the fifth white light driving resistor R4, the other end of the fifth white light driving resistor R4 is grounded. The pin DIM2 of the first white light power supply chip U1 is also connected with one end of the sixth white light driving resistor R13, and the other end of the sixth white light driving resistor R13 is grounded. The pin OUT1 of the first white light power supply chip U1 is also connected with one end of the first white light piezoresistor MOV1, the other end of the first white light piezoresistor MOV1 is grounded. The pin OUT2 of the first white light power supply chip U1 is also connected with one end of the second white light piezoresistor MOV2, and the other end of the second white light piezoresistor MOV2 is grounded. One end of the first white light driving capacitor C9 is also connected between the first white light driving resistor R48 and the pin DIM1 of the first white light power supply chip U1, one end of the second white light driving capacitor C10 is also connected between the second white light driving resistor R49 and the pin DIM2 of the first white light power supply chip U1, and the other ends of the first white light driving capacitor C9 and the second white light driving capacitor C10 are grounded. The pins REXT1 and REXT2 of the second white light power supply chip U2 are grounded through the seventh white light driving resistor R19 and the eighth white light driving resistor R20 respectively, and the pins REXT1 and REXT2 of the third white light power supply chip U3 are grounded through the ninth white light driving resistor R21 and the tenth white light driving resistor R22, respectively.

The silicon controlled dimmer is controlled and different PWM modulation signals are input, to change the brightness of the white light lamp panel 6 from 1 to 100%. U1, U2 and U3 are chips that drive the white light lamp panel 6 to work. The brightness and color temperature of the white light lamp panel 6 are controlled by controlling the signals PWM CW and PWM WW of the pins DIM1 and DIM2. The first white light driving resistor R48, the second white light driving resistor R49, the first white light driving capacitor C9 and the second white light driving capacitor C10 are adaptive to filter the clutter interference in the circuit and improve the brightness stability of the white light lamp panel. The signals PWM WW and PWM CW can also be controlled through the pins WW1 and CW1 of the intelligent module, thereby controlling the brightness and color temperature of the white light lamp panel 6 through U1, U2 and U3, realizing compatible controlling the brightness change of the white light lamp panel 6 with two arts.

Figure 6:
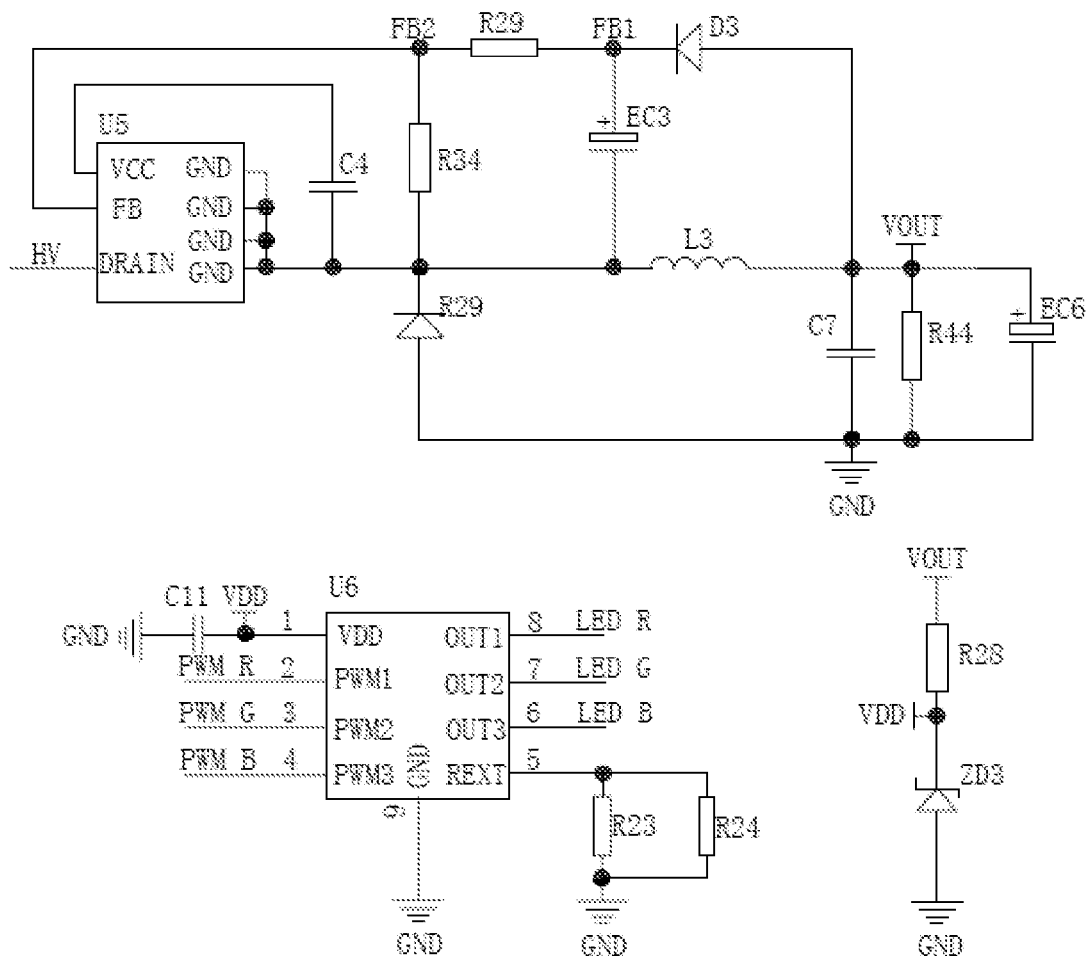
FIG. 6 is a circuit diagram of a RGB driving circuit in one embodiment of the present disclosure.
Figure 7:
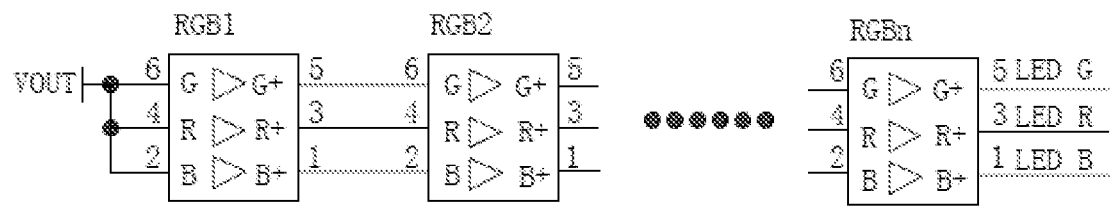
FIG. 7 is a circuit diagram of a RGB lamp panel in one embodiment of the present disclosure.

In particular, referring to FIG. 5 to FIG. 7, the RGB driving circuit 7 includes a RGB driving chip U5 and a RGB control chip U6, a first RGB resistor R34, a second RGB resistor R29, a third RGB resistor R44, a fourth RGB resistor R28, a fifth RGB resistor R25, a sixth RGB resistor R26, a seventh RGB resistor R27, an eighth RGB resistor R23, a ninth RGB resistor R24, a RGB voltage stabilizing resistor ZD3, a first RGB diode D4, a second RGB diode D3, a first RGB inductor L3, a first RGB capacitor EC3, a second RGB capacitor C7, a third RGB capacitor EC6, a fourth RGB capacitor C6, a fifth RGB capacitor C12, and a sixth RGB capacitor C13.

The pin DRAIN of the RGB driving chip U5 is connected with the output end of the rectification circuit 1. The pin FB of the RGB driving chip U5 is connected with one end of the first RGB resistor R34 and the second RGB resistor R29. The other end of the first RGB resistor R34 is connected with the pin GND of the RGB driving chip U5, the negative pole of the first RGB diode D4, one end of the first RGB inductor L3, and the negative pole of the first RGB capacitor EC3. The other end of the second RGB resistor R29 is connected with the positive pole of the first RGB capacitor EC3 and the negative pole of the second RGB diode D3. The positive pole of the second RGB diode D3 is connected with the other end of the first RGB inductor L3, one end of the second RGB capacitor C7, one end of the third RGB resistor R44 and one end of the third RGB capacitor EC6. The other end of the second RGB capacitor C7, the other end of the third RGB resistor R44 and the other end of the third RGB capacitor EC6 are grounded. One end of the third RGB resistor R44 is further connected with one end of the fourth RGB resistor R28, the other end of the fourth RGB resistor R28 is connected with one end of the RGB voltage stabilizing resistor ZD3, and the other end of the RGB voltage stabilizing resistor ZD3 is grounded. The connection node of the fourth RGB resistor R28 and the RGB voltage stabilizing resistor ZD3 is connected with the pin VDD of the RGB control chip U6. The eighth pin, the ninth pin and the tenth pin of the intelligent module 3 are respectively connected with the pins PWM3, PWM2 and PWM1 of the RGB control chip U6, and the pins OUT1, OUT2 and OUT3 of the RGB control chip U6 are respectively connected with the three input ends of the RGB lamp panel.

The tenth pin of the intelligent module 3 is connected with the pin PWM1 of the RGB control chip U6 through the fifth RGB resistor R25, the ninth pin of the intelligent module 3 is connected with the pin PWM2 of the RGB control chip U6 through the sixth RGB resistor R26, the eighth pin of the intelligent module 3 is connected with the pin PWM3 of the RGB control chip U6 through the seventh RGB resistor R27. The fourth RGB capacitor C6 is further connected between the fifth RGB resistor R25 and the pin PWM1 of the RGB control chip U6, the fifth RGB capacitor C12 is connected between the sixth RGB resistor R26 and the pin PWM2 of the RGB control chip, the sixth RGB capacitor C13 is connected between the seventh RGB resistor R27 and the pin PWM3 of the RGB control chip U6, and the other end of the fourth RGB capacitor C6, the other end of the fifth RGB capacitor C12 and the other end of the sixth RGB capacitor C13 are grounded.

The pin REXT of the RGB control chip is connected with one end of the eighth RGB resistor R23 and one end of the ninth RGB resistor R24. The other end of the eighth RGB resistor R23 and the other end of the ninth RGB resistor R24 are grounded.

The RGB driving chip U5 provides a constant voltage for the RGB lamp panel. The RGB control chip U6 can control the brightness and color of the RGB lamp panel, adjust the silicon controlled dimmer, input different signals PWM R, PWM G and PWM B to the pins PWM1, PWM2 and PWM3 of the RGB control chip U6. The RGB control chip U6 outputs control signals to the RGB lamp panel through the pins OUT1, OUT2 and OUT3, thereby controlling the brightness and color of the RGB lamp panel. The fifth RGB resistor R25, the sixth RGB resistor R26 and the seventh RGB resistor R27, as well as the fourth RGB capacitor C6, the fifth RGB capacitor C12 and the sixth RGB capacitor C13 are adaptive to filter out clutter components in the circuit, stabilizing operation of the circuit.

The silicon controlled dimmer needs a certain maintenance current after the silicon controlled being triggered. If the maintenance current is not enough, the silicon controlled dimmer will be triggered by mistake, causing LED to flash. Most intelligent dimming products on the market use PWM dimming IC to make stepless adjustment on the brightness and color temperature of LED. PWM dimming chips generally do not support silicon controlled dimming and cannot provide maintenance current for the silicon controlled, so it is difficult for general intelligent dimming products to be compatible with silicon controlled dimmers. In the present application, maintenance current is provided for the silicon controlled by only configuring a silicon controlled dimming control chip U4 (supporting silicon controlled dimming IC) in the circuit. When PWM dimming IC (driving chip in the white light driving circuit 5) adjusts the brightness of white light from 1 to 100%, the silicon controlled dimming control chip U4 always works normally. When the lighting function of the lighting device is turned off, the nineteenth pin WIFI1_19 of the intelligent chip WIFI1 (control port OFF1 of the intelligent module) is at a low-level state, the current detection resistor of the silicon controlled dimming control chip U4 is disconnected, the output of the silicon controlled dimming control chip U4 is closed, and the product enters a standby mode, so that the standby power is less than 0.5 W, thus realizing a function of low-power consumption.

Figure 8:
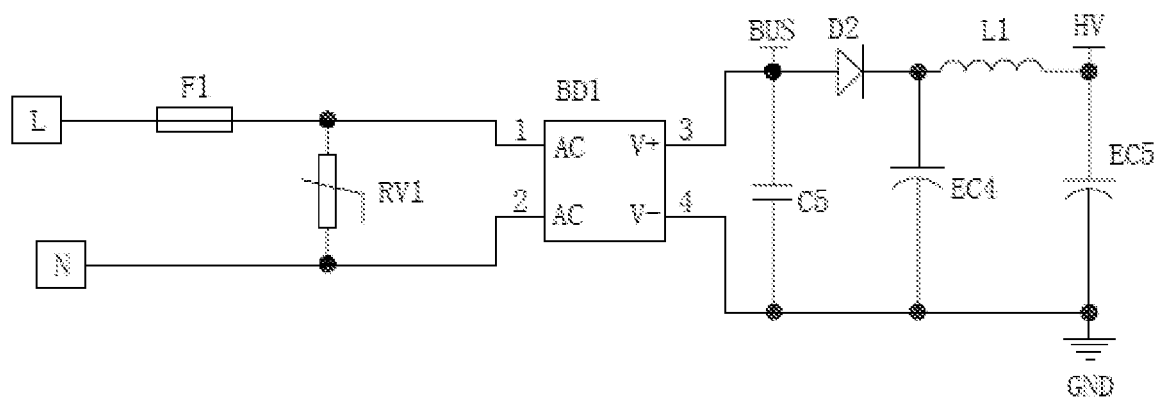
FIG. 8 is a circuit diagram of a rectification circuit in one embodiment of the present disclosure.

In the concrete embodiments, as shown in FIG. 8, the rectification circuit 1 includes a protective tube F1, a high-voltage chip resistor RV1, a rectification chip BD1, a first capacitor C5, a second capacitor EC4, a third capacitor EC5, a first diode D2, and a first inductor L2. One end of the protective tube F1 is connected with the phase line L of the alternating current, the other end of the protective tube is connected with one end of the high-voltage chip resistor RV1 and the first input end of the rectification chip BD1, and the other end of the high-voltage chip resistor RV1 is connected with the second input end BD1_2 of the rectification chip BD1 and the neutral line N of the alternating current N. The positive output end BD1_3 of the rectification chip BD1 is connected with one end of the first capacitor C5 and the positive pole of the first diode D2, whose connection point, as a second output end of the rectification circuit 1, is connected with the first input end of the silicone controlled dimming circuit 4. The negative output end BD1_4 of the rectification chip BD1 is connected with the other end of the first capacitor C5, the positive pole of the second capacitor EC4 and the positive pole of the third capacitor EC5 and is grounded. The negative pole of the first diode D2 is connected with one end of the first inductor L2 and the negative pole of the second capacitor EC4, and the other end of the first inductor L2 is connected with the negative pole of the third capacitor EC5, whose connection point, as a first output end, is connected with the input end of the supply circuit of intelligent module 2. A connection point of the other end of the first inductor L2 and the negative pole of the third capacitor EC5, also as a third output end, is connected with the first input end of the RGB driving circuit 7.

Mains supply flows through the rectification chip BD1, such that AC is converted into DC, and then through the first capacitor C5, the second capacitor EC4 and the third capacitor EC5 to output a stable DC voltage. The first capacitor C5, the second capacitor EC4 and the third capacitor EC5 are adaptive for filtering. The output voltage has a steady waveform through low charge and high discharge of the capacitors. The second capacitor EC4 and the third capacitor EC5 are electrolytic capacitors, which may have larger capacity, to possess better filtering effect. The protective tube F1 is configured to protect the circuit. When the current in the circuit is too large, the protective tube F1 is blown and the circuit is disconnected, thus playing a protective role. The high-voltage chip resistor RV1 has a good high-frequency performance and can be used as a filter capacitor of the circuit.

Figure 9:
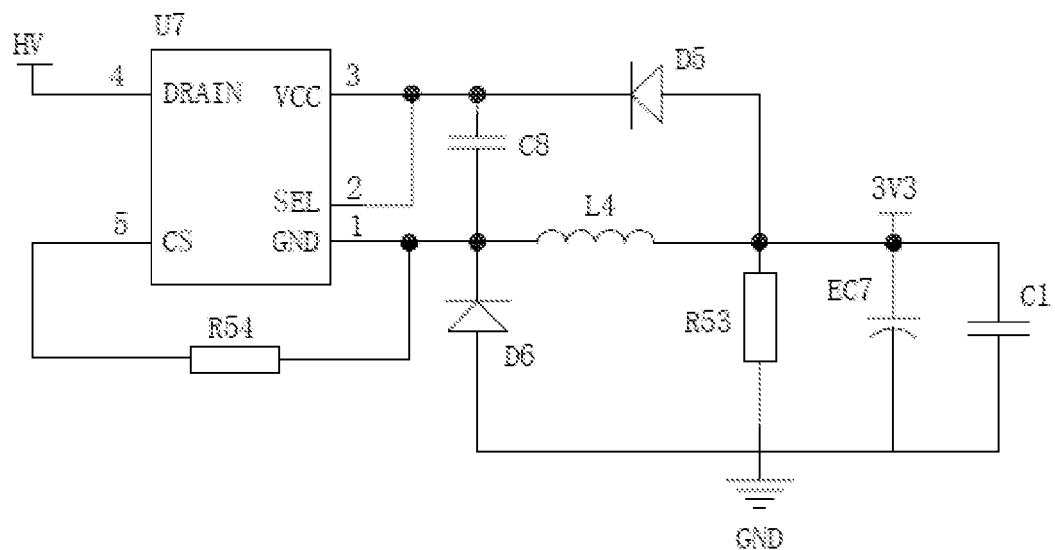
FIG. 9 is a circuit diagram of a supply circuit of intelligent module in one embodiment of the present disclosure.

In concrete embodiment, as shown in FIG. 9, the supply circuit of intelligent module 2 includes a power supply chip U7, a sixth resistor R53, a seventh resistor R54, a fourth capacitor C1, a fifth capacitor EC7, a sixth capacitor C8, a second diode D5, a third diode D6 and s second inductor L4. An input end U7_DR of the power supply chip U7 is connected with the first output end of the rectification chip, an output end U7_VCC of the power supply chip is connected with a selection end U7_SEL, whose connection point is simultaneously connected with one end of the sixth capacitor C8 and a negative pole of the second diode D5, and a grounded terminal U7_GND of the power supply chip is connected with one end of the seventh resistor R54, a negative pole of the third diode D6, the other end of the sixth capacitor C8 and one end of the second inductor L4; the test terminal U7_CS of the power supply chip is connected with the other end of the seventh resistor R54. A positive pole of the second diode D5 is connected with the other end of the second inductor L4, one end of the sixth resistor R53, one end of the fourth capacitor C1 and a negative pole of the fifth capacitor EC7, whose connection point is connected with a regulated power supply 3V3. A positive pole of the third diode D6 is connected with the other end of the sixth resistor R53, the other end of the fourth capacitor C1 and a positive pole of the fifth capacitor EC7, whose connection point is grounded. Voltage of the regulated power supply 3V3 isn't lower than 3.3V.

The input end of the power supply chip U7 receives the steady voltage signals output by the rectification circuit 1, which are converted into the voltage used by the intelligent module 3 through the power supply chip U7 and withstand rectification and filtering again under the diodes, capacitors and other components to make the output voltage signals steadier.

The power supply chip U7 of the supply circuit of intelligent module 2 can provide constant working voltage for the intelligent module 3 (WIFI) or other intelligent modules.

Figure 10:
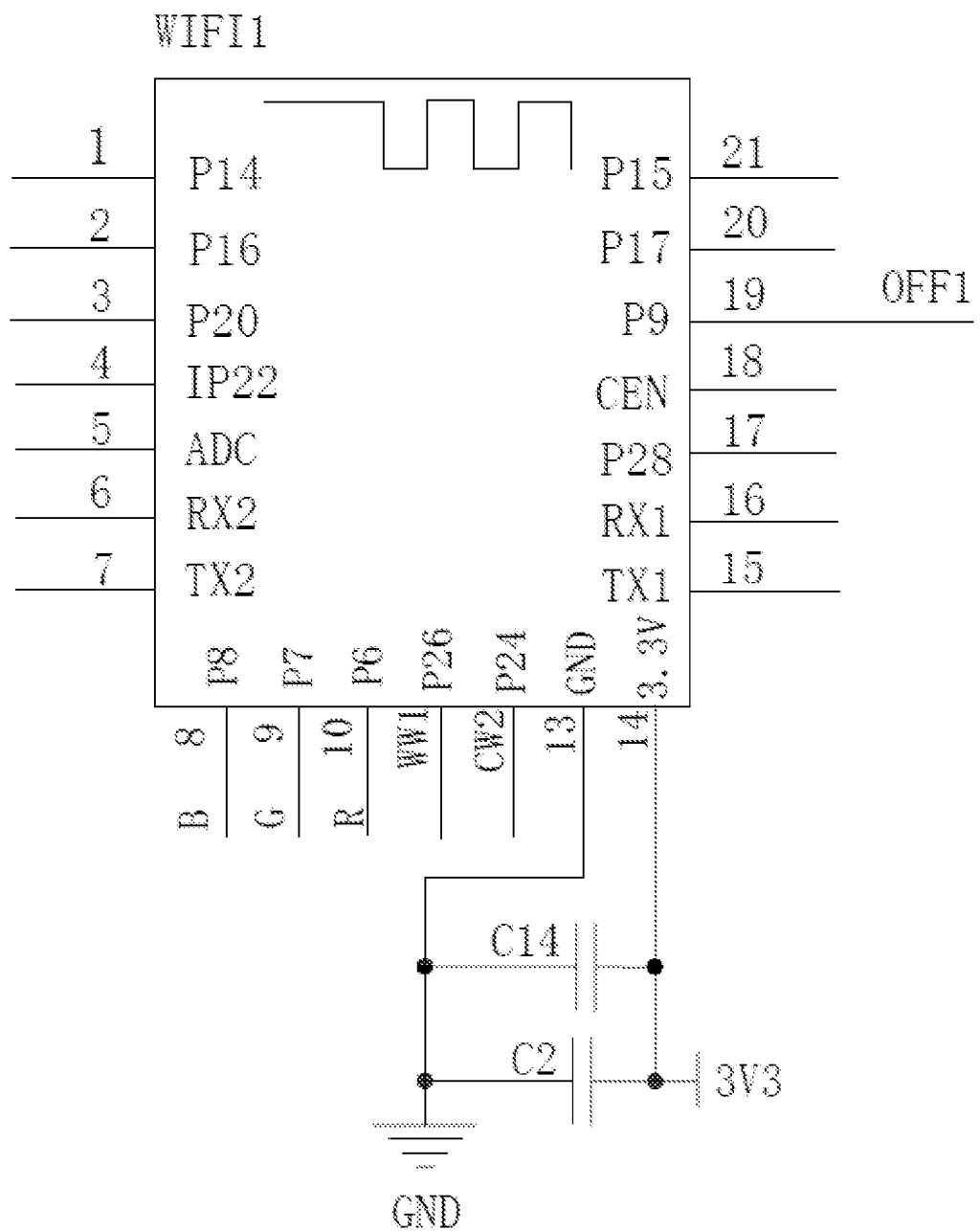
FIG. 10 is a circuit diagram of an intelligent module in one embodiment of the present disclosure.

In concrete embodiment, as shown in FIG. 10, the intelligent module 3 includes an intelligent chip WIFI1, a seventh capacitor C2 and an eighth capacitor C14. The nineteenth pin WIFI1_19 of the intelligent chip WIFI1, as a first output end, is connected with one end of the fifth resistor R16. The thirteenth pin WIFI1_13 of the intelligent chip WIFI1 is connected with one end of the seventh capacitor C2 and one end of the eighth capacitor C14 and is grounded, while the fourteenth pin WIFI1_14 is connected with the other end of the seventh capacitor C2 and the other end of the eighth capacitor C14, whose connection point is connected with the regulated power supply 3V3.

The seventh capacitor C2 and the eighth capacitor C14 are connected in series between the power supply and the grounding, such that the clutter and AC components of the power supply can be filtered out, the pulsating direct current can be smoothed and electric energy can be stored. The nineteenth pin of the intelligent chip WIFI1 can detect the working state of the white light lamp panel 6 and the RGB lamp panel 8. When the product is off, the nineteenth pin of the intelligent chip WIFI1 outputs a low-level voltage.

The intelligent module 3 of the present disclosure can be the above-mentioned intelligent chip WIFI1, or a Bluetooth module, an infrared remote control module and other control modules. The user can send control information to the intelligent module 3 through external devices (such as remote controller or mobile phone etc.), so as to remotely control the lighting device through the control information. The linear scheme used by PWM dimming IC (the driving chip in the white light driving circuit 5) will change dependent on change of the input voltage power. When the silicon controlled dimmer turns down the brightness, the input voltage will decrease, and the input power will also decrease, so that the brightness can be adjusted through the silicon controlled. At the same time, users can also adjust the brightness of the lighting device through a remote controller or a mobile phone APP to improve the compatibility of the lighting device.

The implementation principle of an intelligent lighting device with low-power consumption compatible with silicon controlled dimming according to an embodiment of the present disclosure is as following: the silicon controlled dimming circuit is configured to provide maintenance current. During operation of the white light driving circuit, the silicon controlled dimming circuit keeps working consistently. When the lighting function is turned off, the silicon controlled dimming circuit turns off the output and enters a standby state, thus realizing low-power consumption. The brightness can be adjusted through silicon controlled, namely silicon controlled dimming is compatible, and can also be adjusted by sending wireless signals to the intelligent module through external devices, which greatly improve the compatibility of lighting devices.

The above is only specific embodiments of the present application, but the protection scope of the present application is not limited. Any person skilled in the art can easily obtain various equivalent modifications or replacements within the technical scope disclosed in the present application, which modifications or replacements should be covered in the protection scope of the present application. Therefore, the protection scope of the present application shall be defined by the protection scope of the claims.

LISTING OF REFERENCE SIGNS 1 rectification circuit
2 supply circuit of intelligent module
3 intelligent module
4 silicon controlled dimming circuit
5 white light driving circuit
6 white light lamp panel
7 RGB driving circuit
8 RGB lamp panel

What is claimed is:

1. A lighting device, comprising:
a rectification circuit,
an intelligent module,
a supply circuit for the intelligent module,
a silicon controlled dimming circuit,
a white light driving circuit,
a white light lamp panel,
a red-green-blue (RGB) driving circuit, and
a RGB lamp panel,
wherein an input end of the rectification circuit is connected with an alternating current, a first output end of the rectification circuit is connected with an input end of the supply circuit for the intelligent module, a second output end of the rectification circuit is connected with a first input end of the silicon controlled dimming circuit and a first input end of the white light driving circuit simultaneously, and a third output end of the rectification circuit is connected with a first input end of the RGB driving circuit;
an output end of the supply circuit for the intelligent module is connected with an input end of the intelligent module, a first output end of the intelligent module is connected with a second input end of the silicon controlled dimming circuit, a second output end of the intelligent module is connected with a second input end of the RGB driving circuit, a third output end of the intelligent module is connected with a second input end of the white light driving circuit; and
an output end of the RGB driving circuit is connected with the RGB lamp panel, and an output end of the white light driving circuit is connected with the white light lamp panel.

2. The lighting device according to claim 1, wherein
the silicon controlled dimming circuit comprises a first resistor, a second resistor, a third resistor, a fourth resistor, a field-effect transistor, a piezoresistor and a silicon controlled dimming control chip;
a first end of the first resistor, as the first input end of the silicon controlled dimming circuit, is connected with the second output end of the rectification circuit, a second end of the first resistor is connected with a seventh pin of the silicon controlled dimming control chip and a first end of the piezoresistor;
a second end of the piezoresistor is connected with a first pin of the silicon controlled dimming control chip, a third pin of the silicon controlled dimming control chip, a first end of the fourth resistor, and a source electrode of the field-effect transistor, and the second end of the piezoresistor is grounded;
a second end of the fourth resistor, as the second input end of the silicon controlled dimming circuit, is connected with the first output end of the intelligent module after being connected with a gate electrode of the field-effect transistor; and
a drain electrode of the field-effect transistor is connected with a first end of the third resistor, a second end of the third resistor is connected with a first end of the second resistor and a fourth pin of the silicon controlled dimming control chip, a second end of the second resistor is connected with a second pin of the silicon controlled dimming control chip.

3. The lighting device according to claim 2, wherein the silicon controlled dimming circuit further comprises a fifth resistor, a first end of the fifth resistor is connected with the second end of the fourth resistor and the gate electrode of the field-effect transistor, a second end of the fifth resistor, as the second input end of the silicon controlled dimming circuit, is connected with the intelligent module.

4. The lighting device according to claim 2, wherein the field-effect transistor is an enhanced n-type metal oxide semiconductor (N-MOS) field-effect transistor.

5. The lighting device according to claim 2, wherein
the rectification circuit comprises a high-voltage chip resistor, a rectification chip, a first capacitor, a second capacitor, a third capacitor, a first diode and a first inductor,
a first end of the high-voltage chip resistor is connected with a first input end of the rectification chip and a phase line of the alternating current, a second end of the high-voltage chip resistor is connected with a second input end of the rectification chip and a neutral line of the alternating current;
a positive output end of the rectification chip is connected with a first end of the first capacitor and a positive end of the first diode and has a first connection point connected with the first input end of the silicon controlled dimming circuit as the second output end of the rectification circuit; a negative output end of the rectification chip is connected with a second end of the first capacitor, a positive pole of the second capacitor, and a positive pole of the third capacitor, and the negative output end of the rectification chip is grounded; a negative pole of the first diode is connected with a first end of the first inductor and a negative pole of the second capacitor, a second end of the first inductor is connected with a negative pole of the third capacitor and has a second connection point connected with the input end of the supply circuit for the intelligent module as the first output end of the rectification circuit; and
the second connection point of the second end of the first inductor and the negative pole of the third capacitor, also as the third output end of the rectification circuit, is connected with the first input end of the RGB driving circuit.

6. The lighting device according to claim 5, wherein
the rectification circuit further comprises a protective tube; and
a first end of the protective tube is connected with the phase line of the alternating current, a second end of the protective tube is connected with one end of the high-voltage chip resistor and the first input end of the rectification chip.

7. The lighting device according to claim 2, wherein
the supply circuit for the intelligent module comprises a power supply chip, a sixth resistor, a seventh resistor, a fourth capacitor, a fifth capacitor, a sixth capacitor, a second diode, a third diode and a second inductor;
an input end of the power supply chip is connected with a first output end of a rectification chip of the rectification circuit, an output end of the power supply chip is connected with a selection end, a third connection point is simultaneously connected with a first end of the sixth capacitor and a negative pole of the second diode, and a grounded terminal of the power supply chip is connected with a first end of the seventh resistor, a negative pole of the third diode, a second end of the sixth capacitor and a first end of the second inductor; a test terminal of the power supply chip is connected with a second end of the seventh resistor; and
a positive pole of the second diode is connected with a second end of the second inductor, a first end of the sixth resistor, one end of the fourth capacitor and a negative pole of the fifth capacitor, and a fourth connection point is connected with a regulated power supply; a positive pole of the third diode is connected with a second end of the sixth resistor, a second end of the fourth capacitor and a positive pole of the fifth capacitor, and a fifth connection point is grounded.

8. The lighting device according to claim 7, wherein a voltage of the regulated power supply is not lower than 3.3 V.

9. The lighting device according to claim 2, wherein
the intelligent module comprises an intelligent chip, a seventh capacitor and an eighth capacitor;
a nineteenth pin of the intelligent chip, as the first output end of the intelligent module, is connected with the second input end of the silicon controlled dimming circuit; and
a thirteenth pin of the intelligent chip is connected with a first end of the seventh capacitor and a first end of the eighth capacitor and is grounded, a fourteenth pin of the intelligent chip is connected with a second end of the seventh capacitor and a second end of the eighth capacitor, and a sixth connection point is connected with a regulated power supply.

\* \* \* \* \*